United States Patent
Friman et al.

(10) Patent No.: US 12,123,449 B2
(45) Date of Patent: Oct. 22, 2024

(54) FASTENING ARRANGEMENT FOR SCREENING ASSEMBLY

(71) Applicant: SANDVIK SRP AB, Svedala (SE)

(72) Inventors: Andre Friman, Svedala (SE); Adrien Henssien, Svedala (SE)

(73) Assignee: Sandvik SRP AB, Svedala (SE)

( * ) Notice: Subject to any disclaimer, the term of this patent is extended or adjusted under 35 U.S.C. 154(b) by 0 days.

(21) Appl. No.: 18/277,703

(22) PCT Filed: Jan. 19, 2022

(86) PCT No.: PCT/EP2022/051098
§ 371 (c)(1),
(2) Date: Aug. 17, 2023

(87) PCT Pub. No.: WO2022/175006
PCT Pub. Date: Aug. 25, 2022

(65) Prior Publication Data
US 2024/0125345 A1    Apr. 18, 2024

(30) Foreign Application Priority Data
Feb. 18, 2021   (EP) .................................... 21157786

(51) Int. Cl.
*F16B 23/00*        (2006.01)
*B07B 1/46*         (2006.01)
(Continued)

(52) U.S. Cl.
CPC ........ *F16B 23/0061* (2013.01); *B07B 1/4645* (2013.01); *B25B 13/50* (2013.01);
(Continued)

(58) Field of Classification Search
CPC .................................... B07B 1/46; B07B 1/28
See application file for complete search history.

(56) References Cited

U.S. PATENT DOCUMENTS

2008/0283448 A1    11/2008  Bacho et al.
2012/0234737 A1*    9/2012  Connolly .............. B07B 1/4645
                                                209/405
(Continued)

FOREIGN PATENT DOCUMENTS

EP     3296029 A1    3/2018
EP     3296030 A1    3/2018
(Continued)

OTHER PUBLICATIONS

Albany County Fasteners, 3/8"-16 Stainless Steel Hex Serrated Flange Bolts, Sep. 25, 2020, https://www.albanycountyfasteners.com/3-8-16-stainless-steel-hex-serrated-flange-bolts/12060000.htm (Year: 2020).*

*Primary Examiner* — Jacob S. Scott
*Assistant Examiner* — Miraj T. Patel
(74) *Attorney, Agent, or Firm* — Corinne R. Gorski

(57) ABSTRACT

A fastening arrangement in the form of a pin and sleeve combination is provided for fixing one or more screening media modules on top of screen support panel structure. The fastening arrangement includes a pin capable of being screwed into a sleeve, the pin being provided with engagement elements capable of connecting with complementary projections on a handling tool for facilitation of installing and dismantling the fastening arrangement. A method for fastening the screening media module on to the screen support panel structure, and a screening equipment housing the same for separating solid materials according to size is also provided.

18 Claims, 6 Drawing Sheets

(51) Int. Cl.
*B25B 13/48* (2006.01)
*B25B 13/50* (2006.01)
*F16B 5/02* (2006.01)

(52) U.S. Cl.
CPC ........ *F16B 5/0208* (2013.01); *B07B 2201/02* (2013.01); *B25B 13/481* (2013.01)

(56) References Cited

U.S. PATENT DOCUMENTS

2012/0312130 A1    12/2012   Bauer
2022/0088641 A1*   3/2022   Takev .................. B07B 1/4645

FOREIGN PATENT DOCUMENTS

WO     2016118694 A1    7/2016
WO     2018050842 A1    3/2018

\* cited by examiner

FASTENING ARRANGEMENT FOR SCREENING ASSEMBLY

RELATED APPLICATION DATA

This application is a § 371 National Stage Application of PCT International Application No. PCT/EP2022/051098 filed Jan. 19, 2022 with priority to EP 21157786.1 filed Feb. 18, 2021.

TECHNICAL FIELD

The present disclosure relates to an arrangement for fastening a screening module to a screen support panel of a screening equipment. The disclosure further relates to the method of fastening a screening module to a screen support panel of a screening equipment. It also relates to a screening equipment which uses such a fastening arrangement for the screening module to be fixed on to the screen support panel.

BACKGROUND ART

Screening equipment used for mining and construction applications normally comprises a screen support panel structure and modules of screening media which are arranged on the support structure. Modular screens are advantageous over earlier generations of screens, since individual screening modules can be exchanged when worn out. Since such screens are subjected to substantial forces during use, the screening modules must be affixed to the frame or the support structure to prevent them from becoming loose.

Conventionally used solution has been that of using a sledge-hammer for forcefully knocking down a locking element such as a pin into some sort of a sleeve provided in the support structure. This method of securing and un-securing the media on support structure, not only posed a risk of injury to the operating personnel but also provided an operational challenge since most screens have narrow confined spaces between individual screen decks thereby making difficult any kind of maintenance work including installing and removing screening media. Also, there is not enough space between the screen decks to raise the hammer to sufficient height and strike with enough force.

Currently used solution is a thermoplastic pin and sleeve combination arrangement for fastening screening media module on to a support structure. These fastening combinations eliminate the need for use of large physical force and hazardous sledge-hammers for securing the screening modules to the support structure. EP3296030A1 and EP3296029A1 disclose such a fastening arrangement which uses sleeves in combination with threaded pins. The threaded pin is driven into the sleeves using a screwing tool or a handling tool for engaging with the pin head which is provided with parallel vertical grooves on the outer peripheral surface to facilitate engagement with the handling tool. This tool provides the rotation needed to drive the threaded pin into the sleeve.

However, one major drawback of such an arrangement is that the torque provided by the tool (usually an impact wrench) can lead to the breakage of the pin, causing the fastening arrangement to fail. Yet another drawback of this arrangement is that the parallel vertical grooves in the head of the pin are narrow and difficult to clean periodically. Debris from the material to be screened may get stuck in the grooves preventing the handling tool to engage efficiently with the pin head, thereby making the fastening arrangement dysfunctional.

Accordingly, there exists a need for a fastening arrangement for a screening assembly which addresses the above-mentioned drawbacks.

SUMMARY

The aim of the present disclosure is to overcome or at least reduce the above-mentioned problems that exist in the prior art.

It is an objective of the present disclosure to provide an improved arrangement for fastening a screening module to a screen support panel of a screening equipment.

It is a further objective of the present disclosure to provide a quick, easy and safe fastening arrangement which can be installed and dismantled without the use of hammers or other hazardous tools, and is also feasible for use in confined spaces between the screen decks.

It is another objective of the present disclosure to provide a fastening arrangement in the form of a pin and sleeve assembly, which works on a torque-limiting feature and prevents breakage of the head of the pin due to over-torqueing while screwing in, during installation.

It is yet another objective of the present disclosure to provide a fastening arrangement in the form of a pin and sleeve assembly, which is easy to clean and does not suffer from the problem of accumulation of debris in the grooves of the pin head.

It is also an objective of the present disclosure to provide an improved screen and a method for installing the screening modules on the screen support panel and dismantling the screening modules from the screen support panel in a safe and reliable manner with the use of minimum equipment, effort and skill.

Other objects and advantages of the present disclosure will be more apparent from the following description, which is not intended to limit the scope of the present disclosure.

The above objectives are achieved by the present disclosure as it provides an improved fastening arrangement for affixing screening modules on to the screen support panel.

According to a first aspect of the present disclosure, there is provided an arrangement for fastening a screening module to a screening equipment, which has a screen support panel and a plurality of screening modules which are arranged adjacent to each other on the screen support panel. The screening modules are fastened to the screen support panel with the help of the fastening arrangement which comprises an elongate first element comprising an axially downward extending through opening; an elongate second element comprising a head portion and a lower portion extending axially downwards from the centre of the head portion, the lower portion having threads arranged on the outer surface in a helical angle ($\beta$); wherein the first element is attachable to the screen support panel and adapted to be received in an opening of the screening module or in an opening created by screening modules when they are positioned adjacent to each other on the screen support panel. Further, the second element mechanically engages with the first element, such that the screening module is attached to the screen support panel upon interconnection between the first element and the second element. The first element, which is preferably in the form of a sleeve, is provided with an axially downward extending through opening which is adapted to enter into the opening of the screening module or in the opening created by adjacently positioned screening modules. The second element is preferably in the form of a pin. The threaded second element or the pin is driven down into the opening of the first element or the sleeve, preferably in a screwing motion, in such a way that upon engagement, the screening module gets affixed to the screen support panel. The outer peripheral surface of the head portion of the second element comprises a plurality of radially distributed engagement elements.

Advantageously, these engagement elements on the second element engage with a plurality of complimentary provisions on a handling tool or a screwing tool, such that upon engagement, rotating motion of the second element is enabled.

According to one of the embodiments, the engagement elements on the head portion of the second element are in the form of plurality of grooves having an angular orientation opposite to that of the helical angle ($\beta$) of the threads of the lower portion of the second element.

Advantageously, the fastening arrangement facilitates installing and dismantling the screening modules on the screen support panel in an easy, quick and safe manner. Using the rotary motion of the handling tool, the maintenance personnel can easily and conveniently perform the installation and dismantling operations. Further, the use of this fastening arrangement is safe and does not involve the use of any hazardous equipment or manual force. Assembly of this fastening arrangement can be done using a regular impact driver or similar bolting tool. This fastening arrangement is also advantageous to be used for screening equipment with confined spaces between screen decks where there is not enough space to raise hammers or other heavy instruments to sufficient height to be able to strike them with force on the modules. Instead of hazardous instruments, a simple handling tool is used which is provided with protrusions corresponding to the grooves on the head portion of the second element.

Thus, with the most hazardous step of the fastening process removed, this arrangement provides a reliable, safe and convenient installation and dismantling of screening modules to and from the screen support panel.

It is further advantageous that the grooves on the head portion of the second element make an angle with the vertical axis of the second element. This protects the second element from over-torqueing and eventually breaking during installation when the handling tool engages with the head portion to rotate and screw-in the second element into the opening of the first element. The angular orientation of the grooves of the head of the second element is opposite to that of the helical angle ($\beta$) the thread of the lower portion of the second element. The opposite orientations enable disengagement in the tightening direction.

Preferably, the head portion of the second element is provided with at least two grooves.

Preferably, the head portion of the second element is provided with a plurality of grooves extending substantially axially along the entire length of the head portion of the second element. It is advantageous because the second element will be worn down in accordance with the upper surface of the screening modules subjected to the material that is being screened. For this reason, it is advantageous that the groove has a substantial axial extension in order to avoid being completely worn off.

Optionally, the head portion of the second element is provided with a plurality of grooves extending axially along a limited portion of the length of the head portion of the second element. This works advantageously in cases where the screening module is thick and due to which, the length of the head of the second element is also more. In such cases it would be more convenient to work with grooves extending axially along a limited portion of the length of the head.

According to another embodiment, of the present disclosure, the head portion of the second element is provided with grooves of a triangular shape, with an inclined contact face and one vertical contact face. The inclined contact face makes an angle (a) with a vertical axis of the second element, while the vertical contact face is parallel to the vertical axis of the second element.

Advantageously, this triangular groove is easy to clean and prevents accumulation of debris thereby ensuring uninterrupted functioning of the fastening arrangement. This also makes cleaning before disassembly easier. Another advantage of this fastening arrangement is that at the time of assembling, after a certain torque is reached when tightening the engaged head with the handling tool, the head and tool naturally tend to disengage from each other due to the 'ramp effect' of the grooves. This torque-limiting feature of the embodiment prevents over-torqueing and potentially damaging the head of the second element.

Preferably, the inclined contact face and vertical contact face meet to make an angle ($\alpha$) which is in range of 30 to 60 degrees in order to advantageously achieve the balance between disengaging force and the torque needed to be able to tighten the second element using the handling tool.

Preferably, the angle ($\alpha$) between the inclined contact face and the vertical contact face of the groove on head portion of the second element is greater than the helical angle ($\beta$) of the spiral thread of the lower portion of the second element. Advantageously, this will provide sufficient engagement of the handling tool on the head of the second element.

According to another alternative embodiment of the present disclosure, the head portion of the second element is provided with grooves in the form of radially distributed equidistant parallel ridges which make an angle ($\gamma$) with the vertical axis of the second element. This embodiment also offers the advantageous torque-limiting feature which prevents breakage of the second element while it is being tightened or screwed-in using the handling tool. Further, while dismantling the arrangement, by engaging with the head portion of the second element, and rotating in reverse direction, the tool gets a tendency to grab tighter and tighter on the head portion, thereby pushing itself through any debris that may have accumulated. Further in this embodiment, preferably, the angle ($\gamma$) between the ridges and the vertical axis of the second element is in the range of 30 to 60 degrees.

Preferably, the angle ($\gamma$) between the ridges and the vertical axis of the second element is greater than the helical angle ($\beta$) of the thread of the lower portion of the second element (3).

According to another alternative embodiment of the present disclosure, the engagement elements present on the head portion of the second element are in the form of a plurality of protrusions. The protrusions are radially distributed on the outer surface of the head. Preferably, the protrusions may be in the form of circular buttons jutting out radially from the outer surface of the head of the second element. Optionally, the protrusions may be in the form of three-dimensional triangles which are adapted to engage with the triangular teeth of the handling tool to enable rotation upon engagement.

The first element may be manufactured by a material chosen from the group consisting of rigid or semi rigid plastics and elastomeric materials, and the second element is made of a wear-resistant elastomer which is chosen from the group consisting of thermoplastic polyurethane, cast polyurethane, thermoplastics or combinations thereof. It is important to use a wear-resistant material for the second element, as upon installation, it will be flush with the surface of the screening module and hence will be exposed to wear by material which will be screened.

Preferably, the hardness of the material of the second element is greater than the hardness of the material of the first element. Optionally, the hardness of the material of the second element is substantially the same as the hardness of the material of the first element. This is advantageous because the first element being softer and more elastic will expand and accommodate the second element upon installation and fit together to form the fastening arrangement according to this embodiment.

Preferably, once the fastening arrangement is installed and the second element is engaged with the first element, the upper surface of the head of the second element is aligned axially with the screening module in order to become flush with the upper surface of the screening module upon complete installation of the fastening arrangement. Further, it is preferred if the difference between the diameter of the head of the second element and the diameter of the opening of the screening module or the opening created by adjacent placement of screening modules is substantially small to prevent any dust accumulation in between the edges of the head and that of the opening of the screening module. At the same time, there should be just enough clearance for enabling practical assembly of the fastening arrangement.

According to a second aspect of the present disclosure, the objects of the disclosure are achieved, in full or at least in part by a method for fastening a screening module to a screen support panel of a screening equipment comprising a fastening arrangement. The method comprises the steps of:
- placing an opening of a screening module or an opening created by adjacent screening modules above an opening of a screen support panel, thereby creating an attachment socket;
- inserting into said respective aligned attachment sockets, a first element having an axially extending through opening, followed by inserting a second element into said axially extending through opening of each said first element.
- engaging a handling tool having protrusions complementary and corresponding to the grooves or the protrusions present on the outer peripheral surface of the head portion of the second element and using the tool for rotating the second element in a screwing motion to secure it to the first element thereby attaching the screening module to the screen support panel.

According to a third aspect, there is provided a screening equipment for separating solid materials according to size. The screening equipment comprises at least one screening module arranged over a screen support panel, where the screening module is fastened to the screen support panel by means of a fastening arrangement in the form of pin and sleeve assemblies, as described above, to fix the screening modules on to the screen support panel.

Some of the above embodiments have the beneficial effects of contributing to a decreased risk of accidents and creating a safer work environment during installation and removal of screening modules by enabling the use of standard power tools, such as electric screw drivers or similar, that are safe to operate and by thus eliminating or at least reducing the need to use sledgehammers, screwdrivers, knives and other similar tools during this work. Specifically, the dismantling of the fastening arrangement is extremely simple and just requires a socket/impact driver instead of prybars or knives.

Besides health and safety aspects, at least some of the above embodiments could open the possibility to use modular screening media, also in screening machines with very limited free space between screen decks, where tension media is most commonly used today. Another advantage of the instant disclosure is that the apparent width of the grooves on the head of the second element, in some of the embodiments, will change as the pin head wears, thus indirectly providing a visual wear indicator to the operator.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Embodiments of the present disclosure will now be described with reference to the accompanying drawing. Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure.

Figure 1:
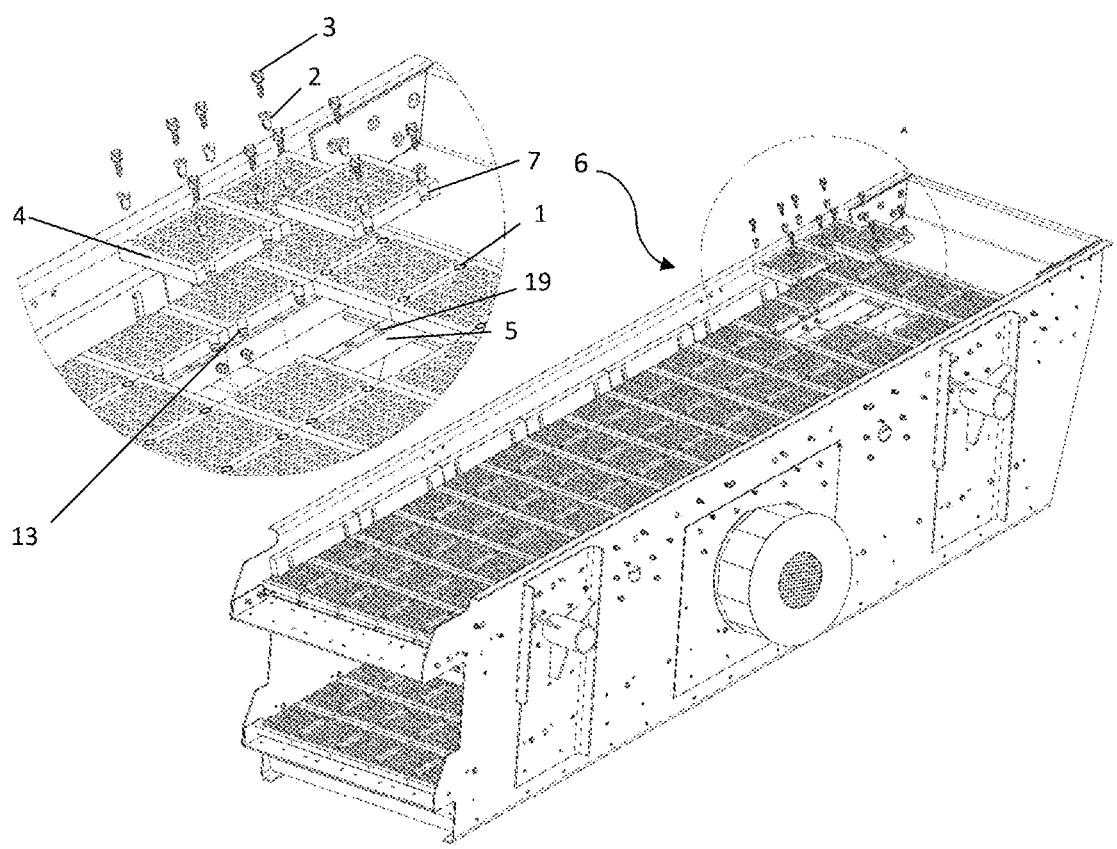
FIG. 1 illustrates schematically a screening equipment for separating solid materials according to size encompassing the fastening arrangement according to the embodiments of the present disclosure.

Referring to FIG. 1, the screening equipment 6 comprises, as shown in more detail in the enlarged view of the circled area as indicated by the dotted arrow, a screening media module 4, a screen support panel 5 and parts of the fastening arrangement 1, namely the first element or the sleeve 2, and the second element or the pin 3. The enlarged view in the circled area in FIG. 1 shows that the opening 7 created by the screening module 4 or the opening 7 created by adjacent placement of screening modules 4 is aligned vertically with the opening 19 of the screen support panel 5, thereby creating an attachment socket 13. To fasten the module 4 to the screen support panel 5, first, the first element 2 is placed into the attachment socket 13, and then the second element 3 is inserted into the axially extending through opening 14 (FIG. 2a) of the first element 2. Upon the interconnection of the first element 2 and the second element 3, the screening module 4 becomes affixed to the screen support panel 5.

Figure 2A:
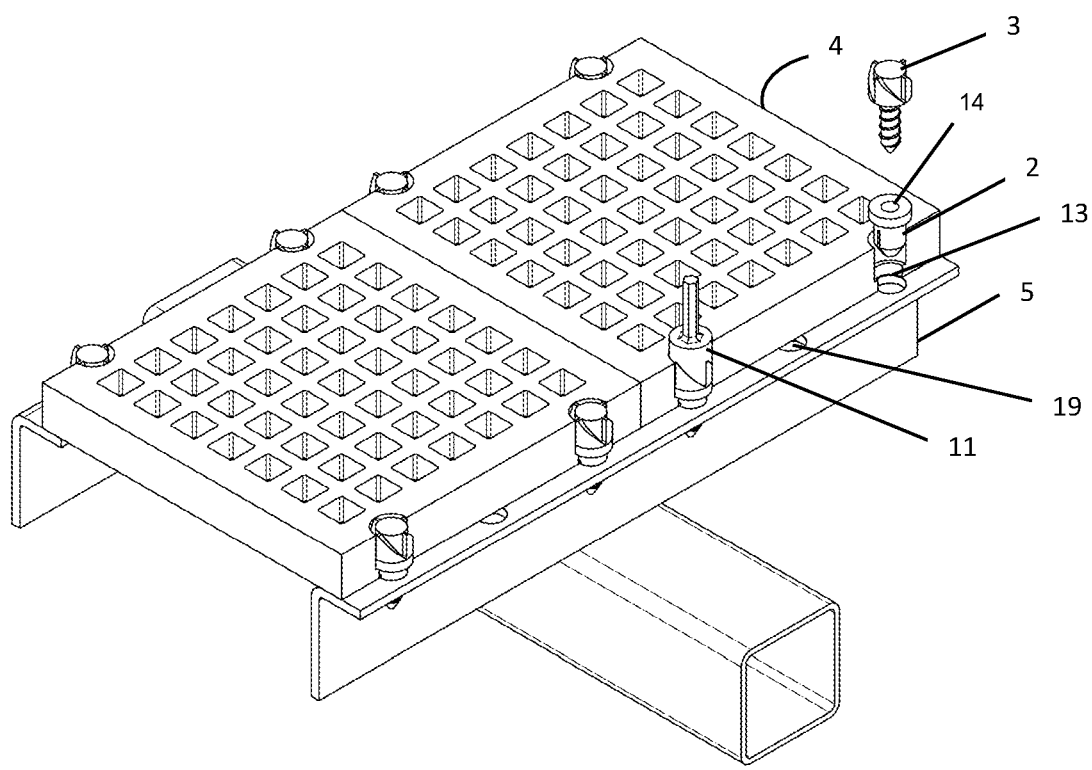
FIG. 2a and FIG. 2b illustrate schematically the screening module positioned on top of a screen support panel and the fastening arrangement, with its parts being used to fix the module on to the screen.
Figure 2B:
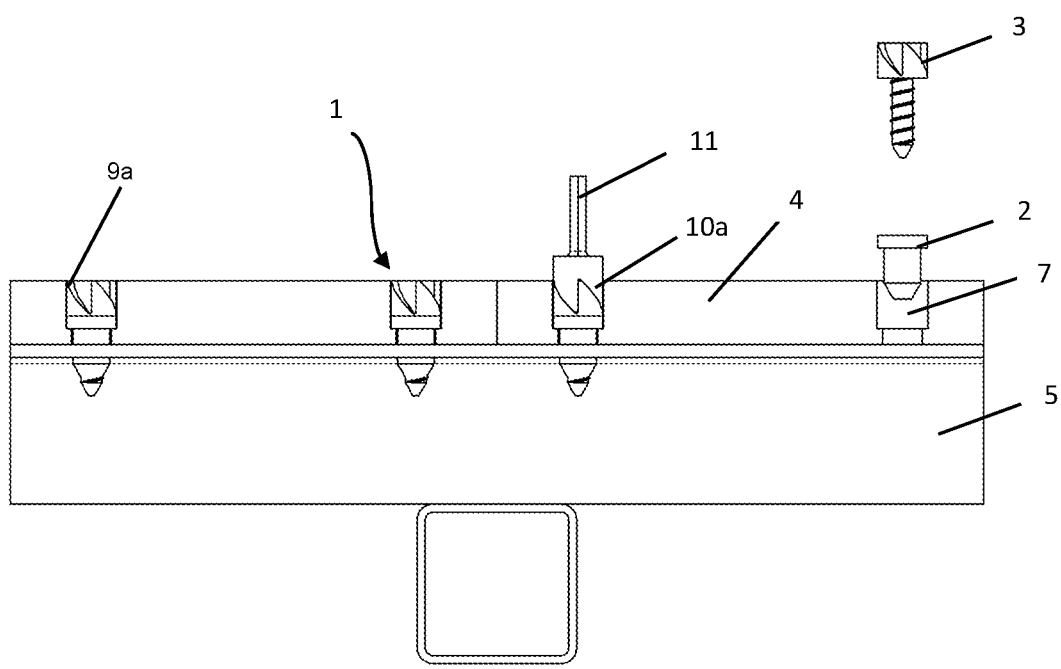

Referring to FIGS. 2a and 2b, the screening module 4 is positioned on top of the screen support panel 5, in such a way that the opening 19 of the screen support panel 5 is vertically aligned with the opening 7 of the screening module 4, thereby creating the attachment socket 13. First element 2 is placed in the attachment socket 13. According to the first embodiment, a handling tool 11 with its protruding teeth 10a engage with the corresponding grooves 9a of the second element 3. With the rotary motion provided by the handling tool 11, the second element 3 is screwed into the first element 2. This interconnection enables the fixture of the screening module 4 with the screen support panel 5.

The first element 2 is suitably made of a polymer material. This polymer material can be polyurethane, thermoplastic polyurethane (TPU) or a similar material. The polymer material can be reinforced for example with fibres. The first element 2 is suitable manufactured by injection moulding.

The second element 3 is made of a wear-resistant elastomer which is can be thermoplastic polyurethane, cast polyurethane, thermoplastics or any combinations thereof. The hardness of the material of the second element 3 may be substantially similar to or greater than the hardness of the material of the first element 2.

Figure 3A:
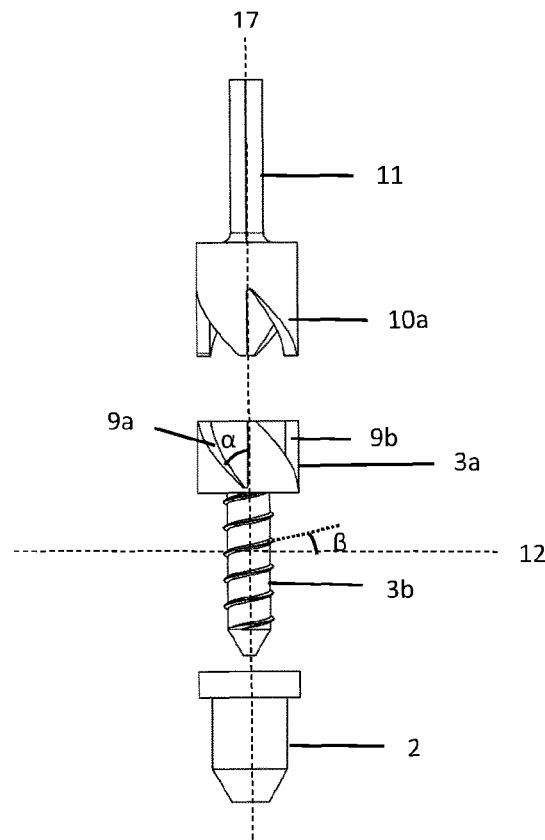
FIG. 3a and FIG. 3b illustrate schematically the fastening arrangement with components according to the first embodiment of the present disclosure.
Figure 3B:
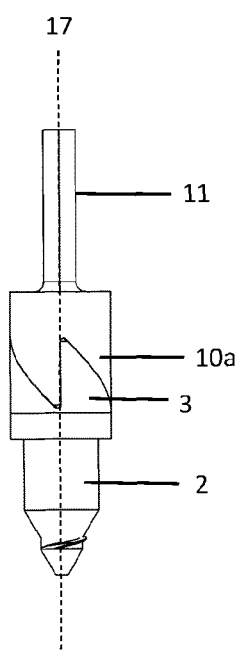

FIGS. 3a and 3b illustrate the first embodiment of the present disclosure in detail. Referring to FIG. 3a, vertical axis 17 passes through the handling tool 11, the second element 3 and the first element 2. The second element 3 comprises of two parts, the head portion 3a and the lower portion 3b which extends downwards from the center of the bottom surface of the head portion 3a. The lower portion 3b is threaded for driving the second element (3) into an axially downward extending through opening 14 (FIG. 2a) of the first element (2) for engagement. The spiral threads on the outer surface of the lower portion 3b make a helical angle β with respect to the horizontal axis 12 which passes through the second element 3.

On the outer peripheral surface of the head portion 3a, are cut out recesses or grooves 9 radially distributed on the head portion 3a, and extending axially along the entire length of the head portion 3a. The grooves 9 according to this embodiment, are triangular in shape with an inclined contact face 9a and a vertical or near vertical contact face 9b which is substantially parallel to the vertical axis 17. The angle of inclination made by the inclined contact face 9a and the vertical contact face 9b is denoted by the symbol α which is less than 30-60 degrees. The angular orientation of the triangular grooves 9 of the head portion 3a is opposite to that of the helix of the spiral thread of the lower portion 3b. The inclination angle α of the triangular groove 9 is greater than the helical angle β of the thread on the lower portion 3b of the second element 3.

The handling tool 11 is provided with triangularly shaped teeth 10a which engage with the corresponding triangular grooves 9 of the head portion 3a of the second element 3, thereby facilitating the insertion or screwing-in of the second element 3 into the opening 14 of the first element 2 by rotating motion of the handling tool 11. Referring to FIG. 3b, the handling tool 11 is mechanically engaged with the head portion 3a of the second element 3, which is shown to be completely inserted into the opening 14 of the first element 2. Upon rotating the handling tool 11, the second element 3 which is engaged with tool 11, also rotates. By rotating, the second element 3 is inserted in a screwing motion into the opening 14 of the first element 2. Similarly, rotating motion of the tool 11 also enables dismantling of the fastening arrangement 1 by disengaging second element 3 from the first element 2.

Figure 4A:
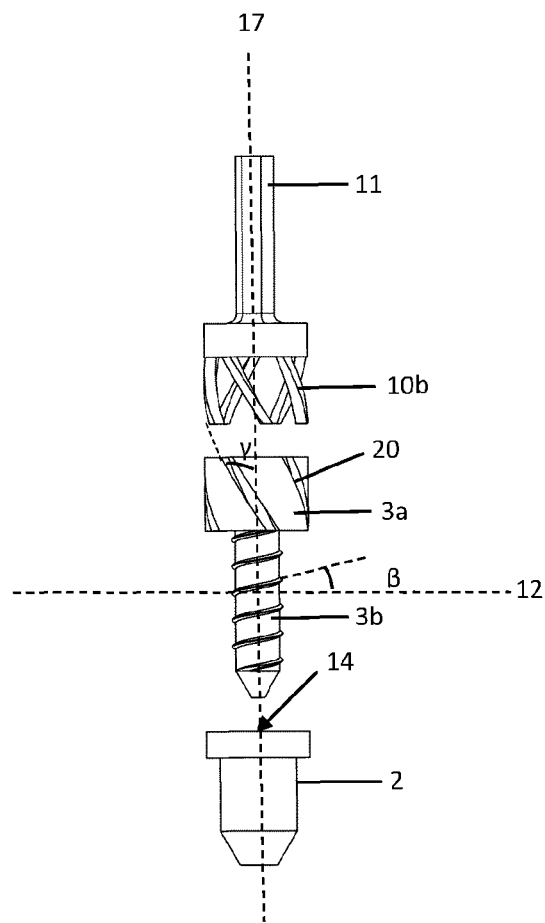
FIG. 4a and FIG. 4b illustrate schematically the fastening arrangement with components according to the second embodiment of the present disclosure.
Figure 4B:
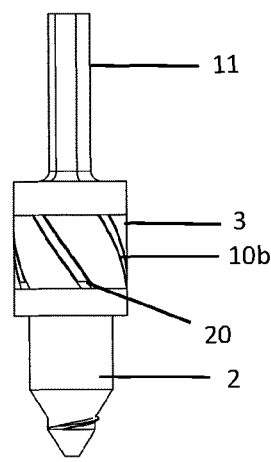

Referring to FIGS. 4a and 4b, the fastening arrangement 1, according to the second embodiment of the present disclosure is illustrated. FIG. 4a shows that the fastening arrangement 1 comprises of the first element 2 and the second element 3. The second element 3 further comprises of the head portion 3a and the lower portion 3b, which is extending axially downwards from the centre of the head portion 3a. The lower portion 3b is threaded on the outer surface, with the threads making a helical angle β with the horizontal axis 12. The head portion 3a is provided with radially distributed inclined parallel ridges 20 extending through the length of the head portion 3a. The parallel ridges 20 make an angle of inclination γ with the vertical axis 17 passing through the centre of the second element 3. The angle of inclination γ is greater than the helical angle β. Further, the angular orientation of the inclined parallel ridges 20 is opposite to that of the helix of the spiral thread of the lower portion 3b. Further, the ridges 20 may extend along the entire length of the head portion 3a or along a pre-determined distance of the length of the head portion 3a of the second element 3.

The handling tool 11 is provided with stick-like protrusions or teeth 10b which are capable of engaging with the parallel ridges 20 on the head portion 3a of the second element 3. FIG. 4b illustrates the complete mechanical engagement of the teeth 10b of the tool 11 with the ridges 20 thereby enabling insertion or screwing-in of the second element 3 into the opening 14 of the first element 2 by rotatory motion of the handling tool 11. Upon rotating the handling tool 11, the second element 3 which is engaged with tool 11, also rotates. By rotating, the second element 3 is inserted in a screwing motion into the opening 14 of the first element 2. Similarly, rotating motion of the tool 11 also enables dismantling of the fastening arrangement 1 by disengaging second element 3 from the first element 2.

Figure 5A:
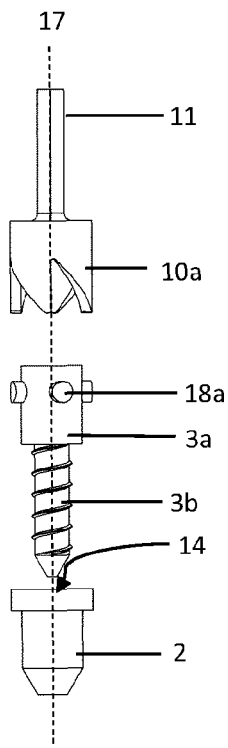
FIG. 5a and FIG. 5b illustrate schematically the fastening arrangement with components according to the third embodiment of the present disclosure.
Figure 5B:
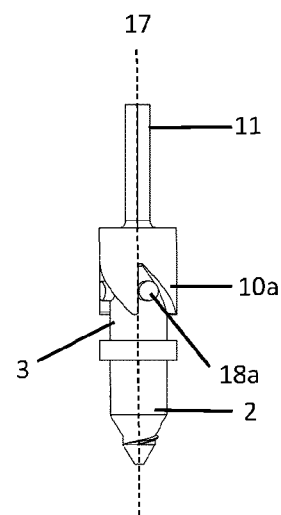

Referring to FIGS. 5a and 5b, according to the third embodiment of the present disclosure, the fastening arrangement 1 is shown to comprise first element 2 and second element 3. Vertical axis 17 passes through the centre of the fastening arrangement 1. As shown in FIG. 5a, the second element 3 includes head portion 3a and the lower portion 3b, which extends axially downwards from the centre of the head portion 3a. The lower portion 3b is provided with spiral threads on the outer surface. The head portion 3b is provided with radially distributed equidistant protrusions 18a on its outer peripheral surface. The protrusions 18a may be in the form of circular buttons as shown in FIG. 5a. Referring to FIG. 5b, the teeth 10a of handling tool 11 are mechanically engaged with the protrusions 18a of the head portion 3a of the second element 3. Upon rotating the handling tool 11, the second element 3 which is engaged with tool 11, also rotates. By rotating, the second element 3 is inserted in a screwing motion into the opening 14 of the first element 2. Similarly, rotating motion of the tool 11 also enables dismantling of the fastening arrangement 1 by disengaging second element 3 from the first element 2.

Figure 5C:
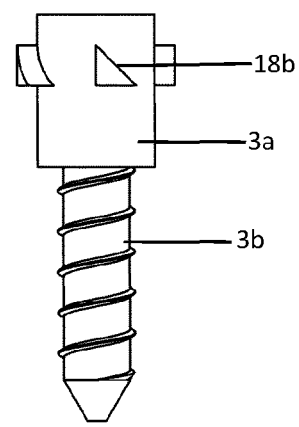
FIG. 5c illustrates schematically the fastening arrangement with components according to the fourth embodiment of the present disclosure.

According to the fourth embodiment of the present disclosure, the protrusions 18b may be in the form of three-dimensional triangles as shown in FIG. 5c. The handling tool 11 is provided with triangular teeth 10a to engage with the protrusions 18b enabling assembly and dismantling of the fastening arrangement using rotating motion.

The method for fastening a screening module 4 to a screen support panel 5 of a screening equipment 6 comprising a fastening arrangement 1 comprises the steps of:

placing an opening 7 of a screening module 4 or an opening (7) created by adjacent screening modules 4 above an opening 19 of a screen support panel 5, thereby creating an attachment socket 13;

inserting into said respective aligned attachment sockets 13, a first element 2 having an axially extending through opening 14, followed by inserting a second element 3 into the axially extending through opening 14 of each first element 2;

engaging a handling tool 11 having protrusions or teeth 10a, 10b complementary and corresponding to the engagement elements (either grooves 9 or protrusions 18a, 18b) on the outer peripheral surface of the head portion 3a of the second element 3, and using the tool 11 for rotating the second element 3 in a screwing motion to secure it to the first element 2 thereby attaching the screening module 4 to the screen support panel 5.

At the end of this process, the second element 3 is completely screwed into the first element 2, in such a way that the top portion of the second element 3 is aligned with the top surface of the screening module 4.

The foregoing description of the embodiments has been provided for purposes of illustration and not intended to limit the scope of the present disclosure.

The invention claimed is:

1. An arrangement for fastening a screening module to a screen support panel of a screening equipment, the arrangement comprising:
    an elongate first element including an axially downward extending through opening; and
    an elongate second element including a head portion and a lower portion extending axially downwards from the centre of the head portion, the lower portion having threads arranged on the outer surface in a helical angle, wherein the first element is attachable to the screen support panel and arranged to be received in an opening of the screening module or in an opening created by screening modules when they are positioned adjacent to each other on the screen support panel, and wherein the second element mechanically engages with the first element, such that the screening module is attached to the screen support panel upon interconnection between the first element and the second element, wherein an outer peripheral surface of the head portion of the second element includes a plurality of radially distributed engagement elements, wherein the engagement elements on the head portion of the second element are in the form of a plurality of grooves extending axially along at least a portion of a length of the head portion second element.

2. The fastening arrangement as claimed in claim 1, wherein each of the plurality of grooves have an angular orientation opposite to that of the helical angle of the threads of the lower portion of the second element.

3. The fastening arrangement as claimed in claim 2, wherein the head portion of the second element is provided with at least two grooves.

4. The fastening arrangement as claimed in claim 1, wherein the plurality of grooves extends substantially axially along an entire length of the head portion of the second element.

5. The fastening arrangement as claimed in claim 1, wherein the head portion of the second element is provided with a plurality of grooves extending axially along a limited portion of a length of the head portion second element.

6. The fastening arrangement as claimed in claim 1, wherein the head portion of the second element is provided with grooves of triangular shape having an inclined contact face and a vertical contact face, wherein the inclined contact face makes an angle ($\alpha$) with a vertical axis of the second element, and the vertical contact face is parallel to the vertical axis of the second element.

7. The fastening arrangement as claimed in claim 6, wherein the inclined contact face and vertical contact face meet to make angle ($\alpha$) which is in range of 30 to 60 degrees.

8. The fastening arrangement as claimed in claim 7, wherein the angle ($\alpha$) between the inclined contact face and the vertical contact face of the groove on head portion of the second element is greater than the helical angle of the spiral thread of the lower portion of the second element.

9. The fastening arrangement as claimed in claim 2, wherein the head portion of the second element is provided with grooves in the form of radially distributed equidistant parallel ridges which make an angle ($\gamma$) with the vertical axis of the second element.

10. The fastening arrangement as claimed in claim 9, wherein the angle ($\gamma$) between the ridges and the vertical axis of the second element is in the range of 30 to 60 degrees.

11. The fastening arrangement as claimed in claim 9, wherein the angle ($\gamma$) between the ridges and the vertical axis of the second element is greater than the helical angle ($\beta$) of the thread of the lower portion of the second element.

12. The fastening arrangement as claimed in claim 1, wherein the engagement elements on the head portion of the second element are in the form of a plurality of radially distributed protrusions.

13. The fastening arrangement as claimed in claim 1, wherein a hardness of a material of the second element is greater than a hardness of a material of the first element.

14. The fastening arrangement as claimed in claim 1, wherein a hardness of a material of the second element is is equal to a hardness of a material of the first element.

15. The fastening arrangement as claimed in claim 1, wherein the second element is made of a wear-resistant elastomer, which is chosen from the group consisting of thermoplastic polyurethane, cast polyurethane, thermoplastics or combinations thereof.

16. The fastening arrangement as claimed in claim 1, wherein the upper surface of the head of the second element is aligned axially with the screening module in order to become flush with the upper surface of the screening module upon complete installation of the fastening arrangement.

17. A method for fastening a screening module to a screen support panel of a screening equipment comprising a fastening arrangement as claimed in claim 1, comprising the steps of:
    placing an opening of a screening module or an opening created by adjacent screening modules above an opening of a screen support panel, thereby creating an attachment socket;
    inserting into respective aligned attachment sockets, a first element having an axially extending through opening, followed by inserting a second element into said axially extending through opening of each said first element;
    engaging a handling tool having protrusions complementary and corresponding to the grooves or the engagement elements on the outer peripheral surface of the head portion of the second element, and using the tool for rotating the second element in a screwing motion to secure it to the first element thereby attaching the screening module to the screen support panel.

18. A screening equipment for separating solid materials according to size, comprising at least one screening module arranged over a screen support panel, wherein said screening module is fastened to the screen support panel by means of a fastening arrangement as claimed in claim 1.

* * * * *